US011308123B2

(12) United States Patent
Acheson et al.

(10) Patent No.: US 11,308,123 B2
(45) Date of Patent: Apr. 19, 2022

(54) SELECTIVELY REPLICATING CHANGES TO HIERARCHIAL DATA STRUCTURES

(71) Applicant: Amazon Technologies, Inc., Seattle, WA (US)

(72) Inventors: Alazel Acheson, Redmond, WA (US); Christopher Ryan Baker, Seattle, WA (US); Mahendra Manshi Chheda, Sammamish, WA (US); James Robert Englert, Seattle, WA (US); Meng Li, Seattle, WA (US); Srikanth Mandadi, Redmond, WA (US); Slavka Praus, Seattle, WA (US); Colin Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 16/888,240

(22) Filed: May 29, 2020

(65) Prior Publication Data

US 2020/0293550 A1 Sep. 17, 2020

Related U.S. Application Data

(63) Continuation of application No. 15/475,031, filed on Mar. 30, 2017, now Pat. No. 10,671,639.

(51) Int. Cl.

*G06F 16/27* (2019.01)
*G06F 16/22* (2019.01)
*G06F 16/23* (2019.01)

(52) U.S. Cl.

CPC ........ *G06F 16/273* (2019.01); *G06F 16/2246* (2019.01); *G06F 16/2379* (2019.01)

(58) Field of Classification Search

CPC ..... G06F 11/1471; G06F 16/184; G06F 16/27

(Continued)

(56) References Cited

U.S. PATENT DOCUMENTS 6,192,365 B1 2/2001 Draper et al.
6,425,016 B1 7/2002 Banavar et al.

(Continued)

FOREIGN PATENT DOCUMENTS

CN 102831156 A 12/2012
CN 102855271 A 1/2013

(Continued)

OTHER PUBLICATIONS

Anonymous, “Wikipedia: Serializability,” Feb. 28, 2016, Retrieved from the Internet: URL:https://en.wikipedia.org/w/index.php?title=Serializability&oldid=707292573 [retrieved on Aug. 11, 2021], the whole document.

(Continued)

*Primary Examiner* — Hung T Vy
(74) *Attorney, Agent, or Firm* — Robert C. Kowert; Kowert, Hood, Munyon, Rankin & Goetzel, P.C.

(57) ABSTRACT

Updates to a hierarchical data structure may be selectively replicated to other replicas of the hierarchical data structure. An update for a hierarchical data structure may be received and committed to the hierarchical data structure. A determination as to whether any other replicas of the hierarchical data structure have permission to receive the update may be made. For those replicas of the hierarchical data structure with permission to receive the update, the update may be provided to the replicas and committed to the replicas. Different types of replication techniques may be implemented, such as pull-based replication techniques or push-based replication techniques. Replication permissions for objects of the hierarchical data structure may be individually defined, in some embodiments.

20 Claims, 12 Drawing Sheets object update(s) 150a
mastered objects 140a
hierarchical data structure 130a
distributed data store 120a
private network 110a
provide eligible object updates 160a
provide eligible object updates 160b
provide eligible object updates 160c
mastered objects 140b
hierarchical data structure 130b
object update(s) 150b
distributed data store 120b
private network 110b
provide eligible object updates 160c
mastered objects 140c
hierarchical data structure 130c
object update(s) 150c
distributed data store 120c
private network 110c

(58) Field of Classification Search
USPC .......................................... 707/626, 648, 615
See application file for complete search history.

(56) References Cited

U.S. PATENT DOCUMENTS

| | | | |
|---|---|---|---|
| 6,968,364 | B1 | 11/2005 | Wong et al. |
| 7,424,671 | B2 | 9/2008 | Elza et al. |
| 7,483,923 | B2 | 1/2009 | Novik |
| 7,549,028 | B2 | 6/2009 | Thompson et al. |
| 7,603,393 | B1 | 10/2009 | Cote et al. |
| 7,617,262 | B2 | 11/2009 | Prahlad et al. |
| 7,689,602 | B1 * | 3/2010 | Sim-Tang ........... G06F 16/2246 707/673 |
| 7,734,578 | B2 | 6/2010 | Prahlad et al. |
| 7,822,711 | B1 | 10/2010 | Ranade |
| 8,024,294 | B2 | 9/2011 | Kottomtharayil |
| 8,060,619 | B1 * | 11/2011 | Saulpaugh .............. G06F 16/27 709/227 |
| 8,489,656 | B2 | 7/2013 | Erofeev |
| 8,849,955 | B2 | 9/2014 | Prahlad et al. |
| 8,880,474 | B2 | 11/2014 | Mason et al. |
| 8,886,601 | B1 * | 11/2014 | Landau ................. G06F 16/273 707/625 |
| 9,053,124 | B1 | 6/2015 | Dornquast et al. |
| 10,671,639 | B1 | 6/2020 | Acheson et al. |
| 2005/0086384 | A1 | 4/2005 | Ernst |
| 2007/0150341 | A1 | 6/2007 | Zia et al. |
| 2007/0226730 | A1 | 9/2007 | Coyle et al. |
| 2009/0006489 | A1 | 1/2009 | Ramasubramanian et al. |
| 2010/0030752 | A1 | 2/2010 | Goldentouch |
| 2011/0153566 | A1 | 6/2011 | Larson et al. |
| 2012/0101991 | A1 * | 4/2012 | Srivas ..................... G06F 16/23 707/623 |
| 2012/0254111 | A1 | 10/2012 | Carmichael |
| 2014/0280360 | A1 | 9/2014 | Webber et al. |
| 2015/0112934 | A1 | 4/2015 | Quakkelaar et al. |
| 2015/0134637 | A1 | 5/2015 | Pall et al. |
| 2015/0293820 | A1 | 10/2015 | Doshi et al. |
| 2015/0356019 | A1 | 12/2015 | Johar et al. |
| 2015/0363468 | A1 | 12/2015 | Alvey et al. |

FOREIGN PATENT DOCUMENTS

| | | | |
|---|---|---|---|
| CN | 103164219 | A | 6/2013 |
| CN | 104216955 | A | 12/2014 |
| CN | 104281506 | A | 1/2015 |
| CN | 104636084 | A | 5/2015 |
| CN | 105122241 | A | 12/2015 |
| JP | 2008538632 | | 10/2008 |
| JP | 2013543601 | A | 12/2013 |
| JP | 2015232879 | | 12/2015 |
| JP | 2016511486 | A | 4/2016 |
| JP | 2016511489 | | 4/2016 |
| KR | 10-2015-0122226 | | 10/2015 |
| WO | 2006115589 | | 11/2006 |
| WO | 2013035295 | A1 | 3/2013 |
| WO | 2014150538 | | 9/2014 |
| WO | 2015200686 | A1 | 12/2015 |

OTHER PUBLICATIONS

Anonymous, "DBMS States of Transaction—javapoint," Oct. 1, 2021, Retrieved from the Internet: URL:https://web.archive.org/web/20201001122205/https://www.javatpoint.com/dbms-states-of-transaction [retrieved on Aug. 11, 2021], the whole document.

"Azure AD: Under the hood of our geo-redundant, highly available, distributed cloud directory," Alex Simons, Sep. 2, 2014, available at https://blogs.technet.microsoft.com/ad/2014/09/02/azure-ad-under-the-hood-of-our-geo-redundant-highly-available-distributed-cloud-directory/#, pp. 1-9.

U.S. Appl. No. 15/132,098, filed Apr. 18, 2016, Srikanth Mandadi, et al.

U.S. Appl. No. 15/475,020, filed Mar. 30, 2017, Srikanth Mandadi, et al.

U.S. Appl. No. 15/475,007, filed Mar. 30, 2017, Mahendra Manshi Chheda, et al.

U.S. Appl. No. 15/475,024, filed Mar. 30, 2017, Mahendra Manshi Chheda, et al.

U.S. Appl. No. 15/475,034, filed Mar. 30, 2017, Mahendra Manshi Chheda, et al.

* cited by examiner

SELECTIVELY REPLICATING CHANGES TO HIERARCHIAL DATA STRUCTURES

This application is a continuation of U.S. patent application Ser. No. 15/475,031, filed Mar. 30, 2017, which is hereby incorporated by reference herein it its entirety.

BACKGROUND

Hierarchical storage systems have implemented many different storage schemes for efficiently and reliably persisting data. Storage schemes implemented on distributed system architecture are often deployed when storage system client applications require greater availability of the data persisted in the data storage system. Common solutions to making data available including storing one or more versions or replicas of data on multiple storage hosts. However, by increasing the number of versions or replicas, the complexity and operational costs for generating consistent views of hierarchical data increases. For example, synchronization protocols may require that a single component be allowed to handle operations such as writes or other modifications to the hierarchical data. Such a synchronization protocol would reduce the availability of the distributed system to respond to client requests, as the single component may become overburdened.

Figure 1:
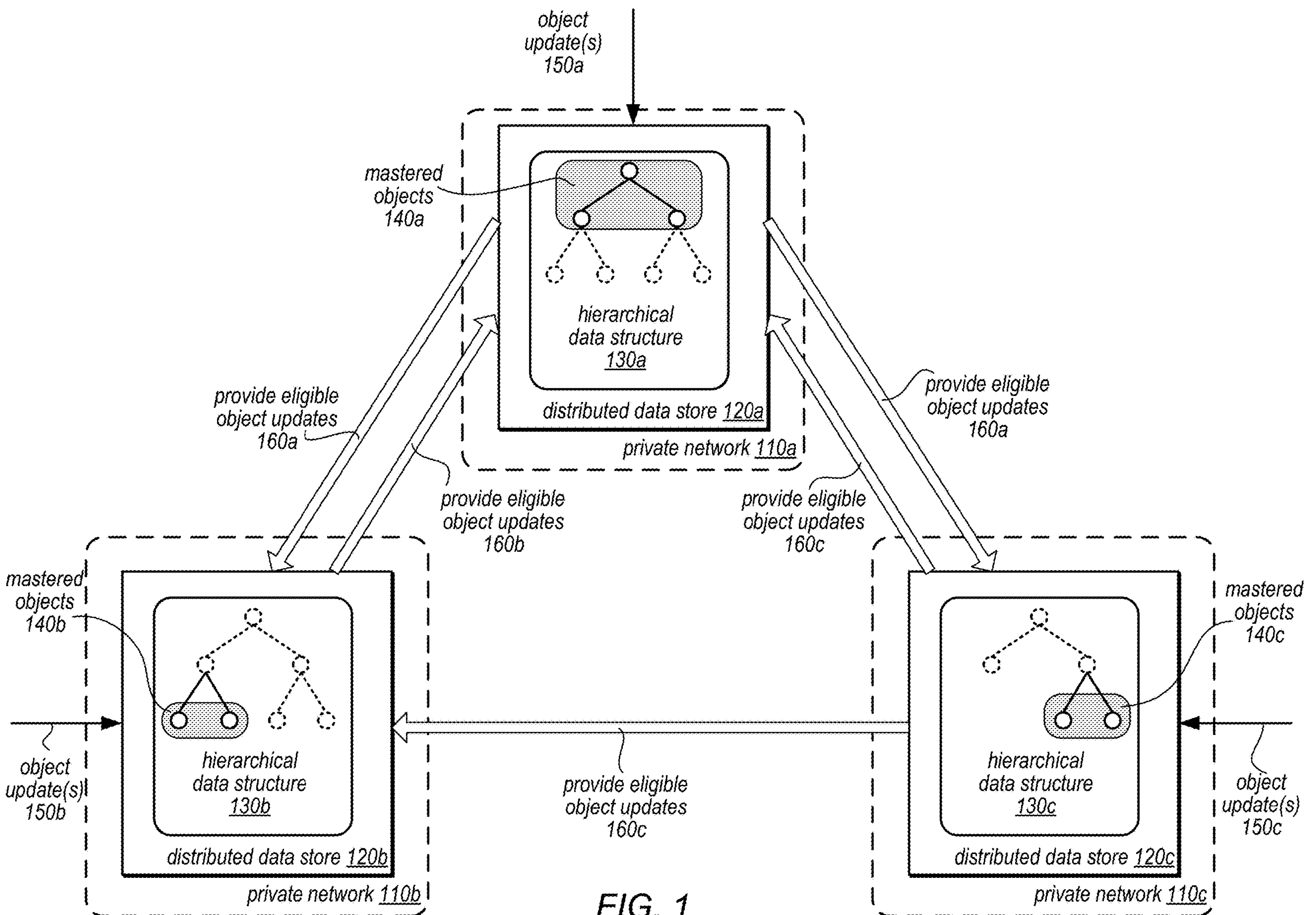
FIG. 1 is a logical block diagram illustrating selectively replicating changes to hierarchical data structures, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of selectively replicating changes to hierarchical data structures are described herein. FIG. 1 is a logical block diagram illustrating selectively replicating changes to hierarchical data structures, according to some embodiments. A hierarchical data structure, such as hierarchical data structure 130 may be stored as part of a distributed data store, in some embodiments. A hierarchical data structure may include one or multiple objects organized according to one or multiple links that provide relationships, paths or other form of hierarchy between objects, in some embodiments. In this way, the relationship of objects, and data values associated or stored as part of objects, can be modeled and maintained in the data structure. For example, an organization chart indicating the reporting structure between company managers and employees can be modeled in a hierarchical data structure that indicates the relationship between employees, and may include data specific to each employee (e.g., name, assignment, years of service, etc.), in one embodiment.

Respective copies or replicas hierarchical data structures can be maintained on multiple different storage hosts in a single distributed data store, as well as at other distributed data stores. For example, hierarchal data structure 130*a* has replicas 130*b* and 130*c* in distributed data stores 120*b* and 120*c* respectively. In at least some embodiments, each distributed data store may be removed from other distributed data stores. In some embodiments, each distributed data store may be implemented in a separate private network. Connections between networks 110 may be made via public network connections (e.g., over the Internet), in some embodiments. Different parts of the same hierarchical data structure may be owned or mastered in different distributed data stores. For example, mastered objects 140*a* in distributed data store 120*a* differ from those mastered objects 140*b* and 140*c* distributed data stores 120*b* and 120*c* respectively. Each distributed data store may receive requests to update objects, 150, in the hierarchical data structure 130, which may be performed for those objects that are mastered in the distributed data store 120.

Selective replication of updates to objects made at different replicas of the hierarchical data structure 130 may be performed, in various embodiments. The replication settings, policy, or other attributes of individual objects within a hierarchical data structure may be defined, in some embodiments (e.g., by a client or default system value). In this way, the objects and/or updates to objects that need to be shared with another replica of the hierarchical data structure 130 in order support the operation of systems that access the other replica can be managed. Consider a scenario where an application that manages employee data maintained in a hierarchical data structure is implemented to access different copies of the hierarchical data structure for different geographic regions. Each geographic region may have specific privacy laws or regulations for employee data which limit the type of information that may be shared outside of the geographic region. In order to satisfy these regulations, some employee data may not be replicated to other copies of the employee data maintained in different data stores so that the privacy laws or regulations are satisfied. Defined replication attributes for objects within the employee data may allow for replication of allowed data to be performed without replicating data that is only available in limited locations.

As illustrated in FIG. 1, different updates for different objects may be replicated to different data stores. For example, some objects (or updates objects), such as objects 140*b* and 140*c* may be replicated to distributed data store 120*a* by providing 160*b* and 160*c* those updates to distributed data store 120*a* from distributed data stores 120*b* and 120*c*, according to replication settings or permissions for objects 140*b* and 140*c*. However, some objects or updates may not be replicated. For example, while distributed data store 120*b* can provide a client of distributed data store 120*b* with the ability to view and read objects mastered in distributed data store 120*c* (objects 140*c*), distributed data store 120*c* cannot provide clients of distributed data store 120*c* with the ability to view or read objects mastered in distributed data store 120*b* (objects 140*b*). Different replication settings, permissions, or attributes for different objects in a hierarchical data structure may allow the management and visibility of data in the same hierarchical data structure to be different in different replicas at different distributed data stores.

Please note, FIG. 1 is provided as a logical illustration of a hierarchical data structures, distributed data stores, private networks and providing updates, and is not intended to be limiting as to the physical arrangement, size, or number of components, modules, or devices, implementing such features.

The specification first describes an example of directory storage service that performs selective updates to hierarchical data structures at the directory storage service, according to various embodiments. The example directory storage service may store hierarchical data structures for many different clients, in various embodiments. Included in the description of the example directory storage service are various aspects of the example directory storage service along with the various interactions between the directory storage service and clients. The specification then describes a flowchart of various embodiments of methods for performing selective updates to hierarchical data structures. Next, the specification describes an example system that may implement the disclosed techniques. Various examples are provided throughout the specification.

Figure 2:
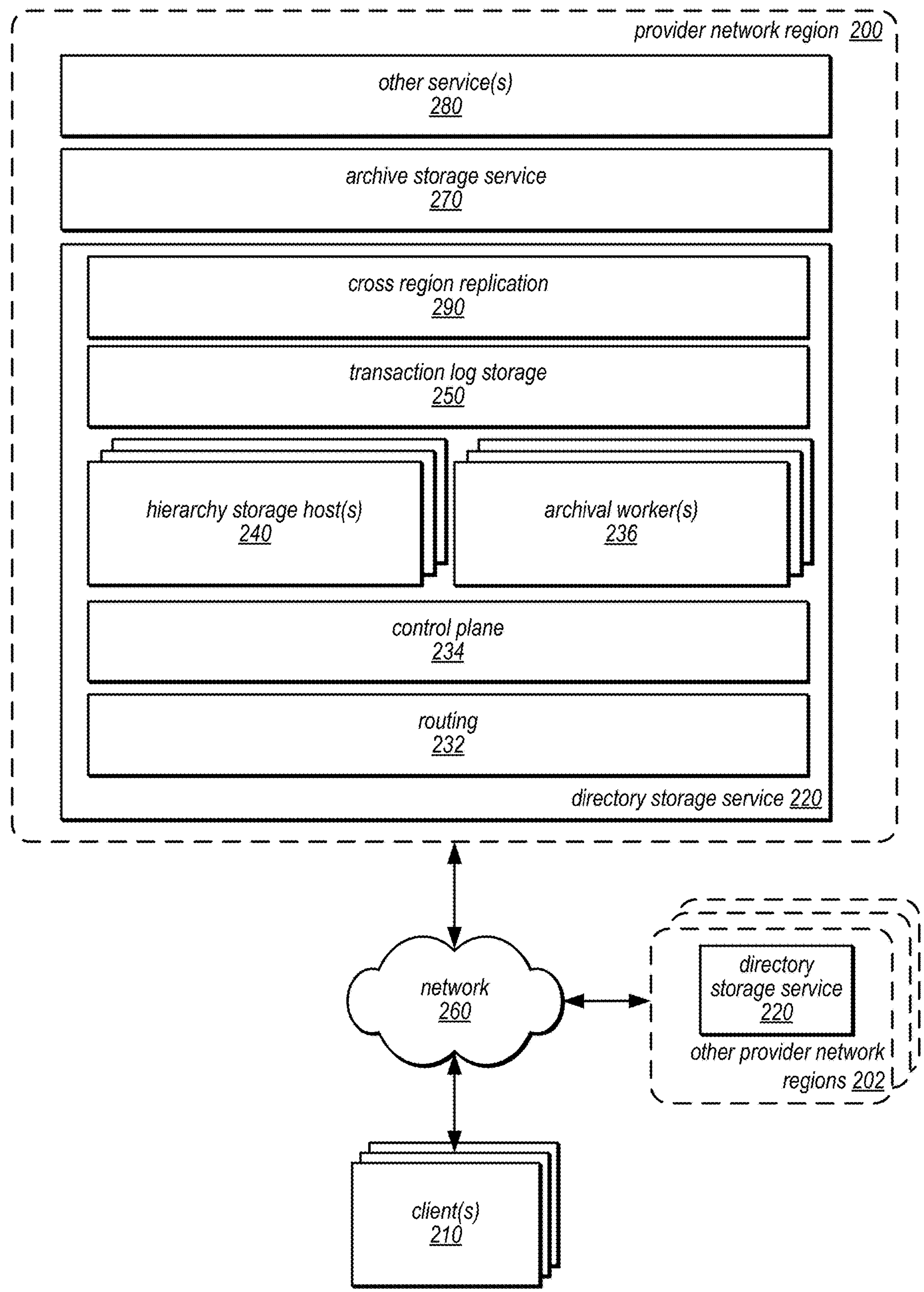
FIG. 2 is a block diagram illustrating a provider network that implements a directory storage service including a hierarchical data store that selectively replicates changes to hierarchical data structures, according to some embodiments.

FIG. 2 is a block diagram illustrating a provider network that implements a directory storage service including a hierarchical data store that selectively replicates changes to hierarchical data structures, according to some embodiments. A provider network may be set up by an entity such as a company or a public sector organization to provide one or more services (such as various types of cloud-based computing or storage) accessible via the Internet and/or other networks to clients 210. Provider network may include numerous data centers hosting various resource pools, such as collections of physical and/or virtualized computer servers, storage devices, networking equipment and the like (e.g., computing system 2000 described below with regard to FIG. 12) and regions, like provider network regions 200 and 202 and may implement the same services in different regions (e.g., directory storage service 220), needed to implement and distribute the infrastructure and services offered by the provider network. In some embodiments, regions may be private networks that isolate faults from other regions. Connections between regions may be over network 260 (which may be a public network like the Internet). In some embodiments, a provider network may implement a directory storage service 220 to store hierarchical data structures for access, archive storage service 270, and/or any other type of network based services 280 (which may include other computing resources or services, such as a virtual compute service and storage services, such as object storage services, block-based storage services, data warehouse storage service, or any other types of storage, processing, analysis, communication, event handling, visualization, and security services). Clients 210 may access these various services offered by provider network 200 via network 260. Likewise network-based services may themselves communicate and/or make use of one another to provide different services. For example, various ones of other service(s) 280 may store, access, and/or rely upon hierarchical data structures stored in directory storage service 220.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Figure 4:
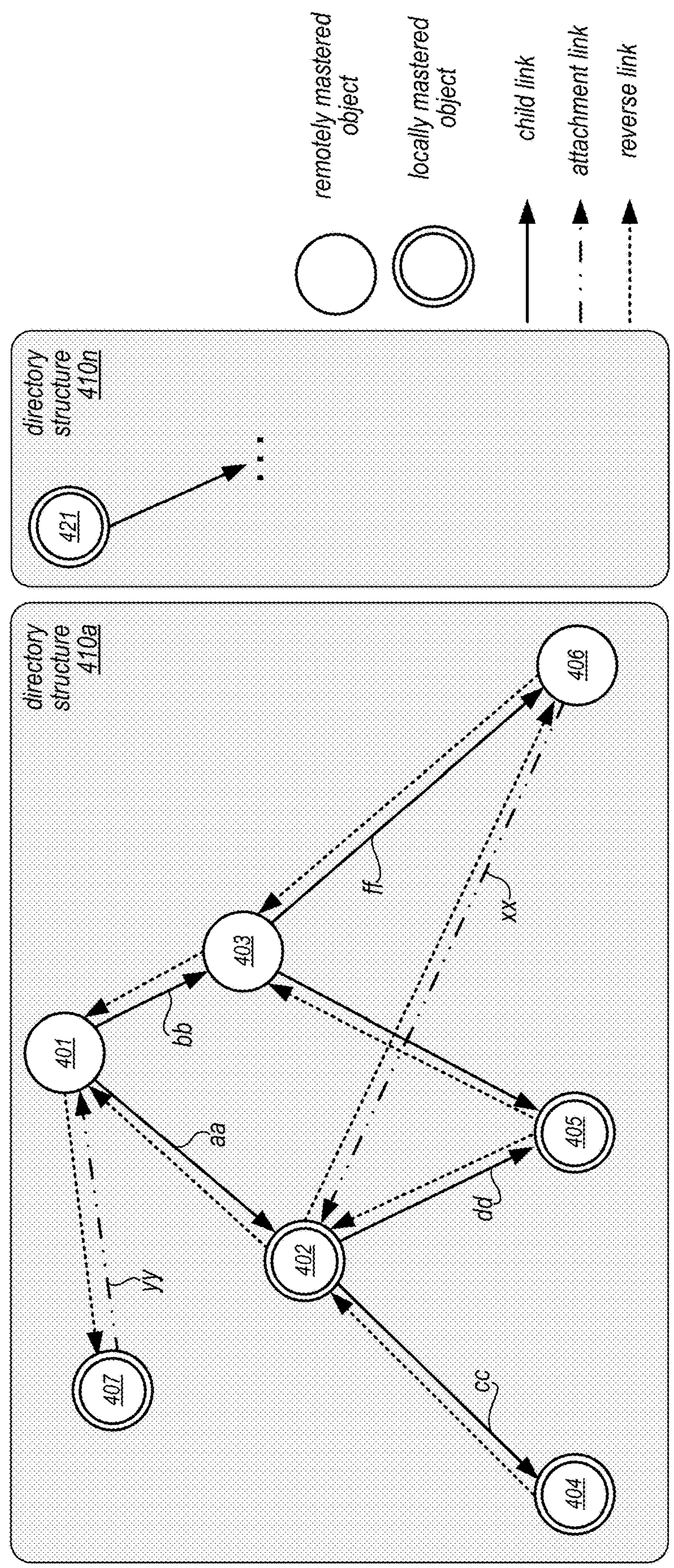
FIG. 4 is a block diagram illustrating a data model for a hierarchal data store that provides hierarchical data structures, according to some embodiments.

Directory storage service 220 may store, manage, and maintain hierarchical data structures, such as a directory structure discussed below with regard to FIG. 4, stored at various ones of hierarchy storage host(s) 240 (in single tenant or multi-tenant fashion). Clients of directory storage service 220 may operate on any subset or portion of the hierarchical data structure with transactional semantics and/or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical directory structure (e.g., reading parts of the hierarchical directory structure, adding a node, and indexing some of the node's attributes, while imposing the requirement that the resulting updates of the operations within the transaction are isolated, consistent, atomic and durably stored).

Figure 5:
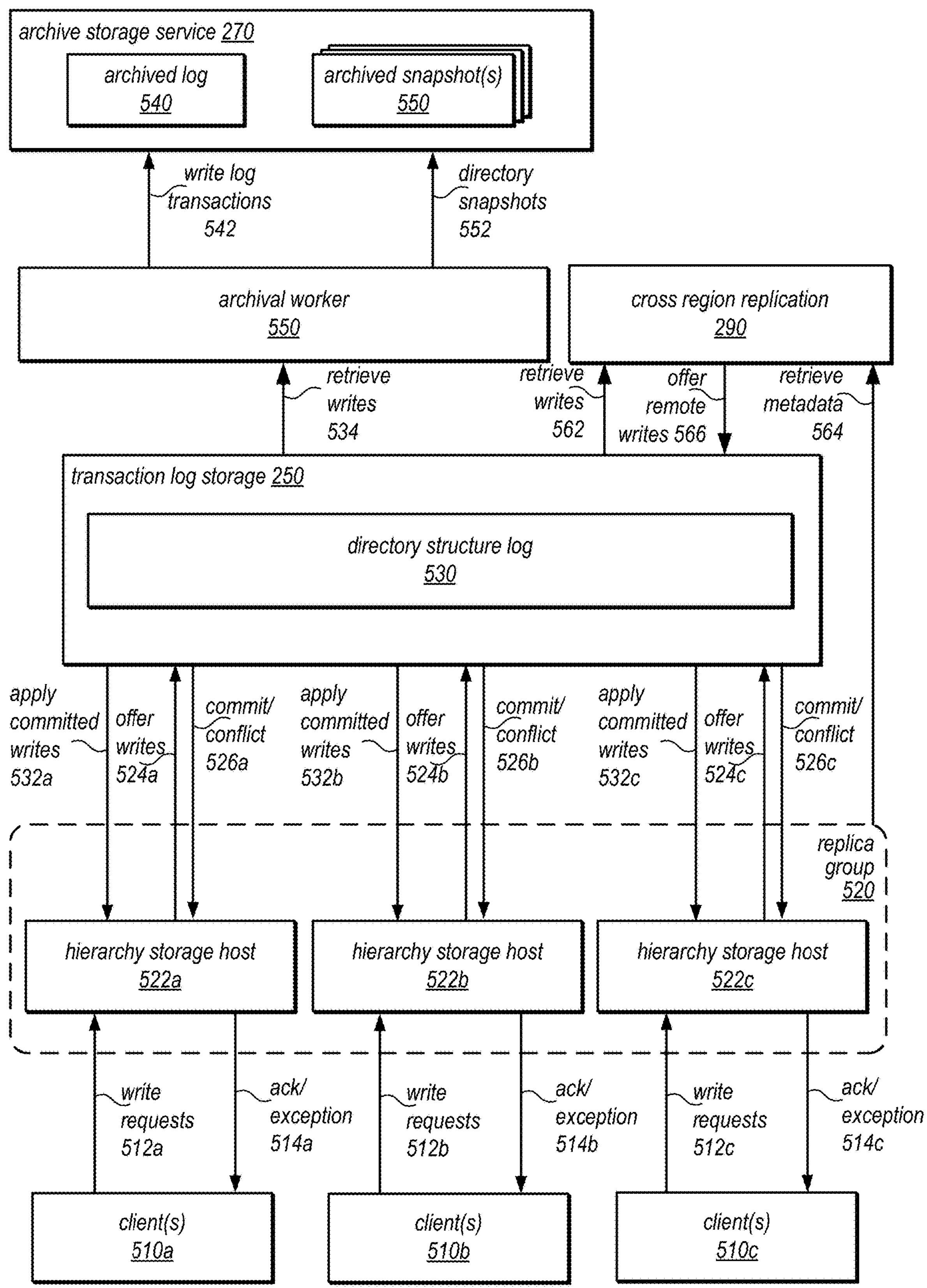
FIG. 5 is a block diagram illustrating the use of a separate transaction log store to provide consistent storage for hierarchical data structures, according to some embodiments.

In various embodiments, directory storage service 220 may implement routing layer 232 to direct access requests from internal or external clients to the appropriate hierarchical storage host(s) 240. For example, routing layer 232 may implement a fleet of routing nodes that maintain mapping information which identifies the locations of a hierarchical data structures on hierarchy storage host(s) 240. When an access request is received, routing layer nodes may then determine which one of the hierarchy storage host(s) that hosts the hierarchical data structure identified in the access request to send the access request. Consider a scenario where hierarchical data structures may be replicated across multiple different hierarchy storage hosts 240 as part of a replica group, such as illustrated in FIG. 5 discussed below. Routing 232 may implement various load balancing schemes to direct requests from different clients to different hierarchy storage hosts within the replica group, so that no single hierarchy storage host becomes overburdened. Moreover, as hierarchy storage hosts 240 may utilize tokens to maintain state across different access requests sent by clients so that different hierarchy storage host(s) 240 may handle each request from the client, routing 232 need not track which hierarchy storage host is communicating with which client.

Control plane 234 may implement various control functions to manage the hierarchy storage host(s) 240 and other components of directory storage service 220 that provide storage of hierarchical data structures, such as directing creation and placement of new hierarchical data structures on hierarchy storage host(s) 240, storage scaling, heat management, node repair and/or replacement. For example, various placement schemes may utilize techniques such as consistent hashing (e.g., based on hashing an identifier for individual hierarchical data structures) to identify hierarchy storage host(s) to store versions of the hierarchical data structure, or randomly mapping hierarchical data structures to a number hierarchy storage host(s) 240 that form a replica set. To provide heat management, for example, control plane 234 may collect hierarchy storage host(s) 240 metrics published by each host. Each host may have various thresholds for performance characteristics, such as memory utilization, CPU utilization, disk utilization, and request-rate capacity. When a hierarchy storage host reports metrics that exceed a threshold (or multiple thresholds), control plane 234 may determine and perform a scaling events for hierarchy storage e hosts. For example control plane 235 may direct the migration of one or more hierarchical data structures to different hierarchy storage hosts. Similarly, control plane 234 may detect when certain hierarchy storage hosts are unable to keep up with access requests directed to a particular replica group for a hierarchical data structure and may provision additional hierarchy storage host(s) to horizontally scale the replica group to better meet the access request demand.

Figure 3:
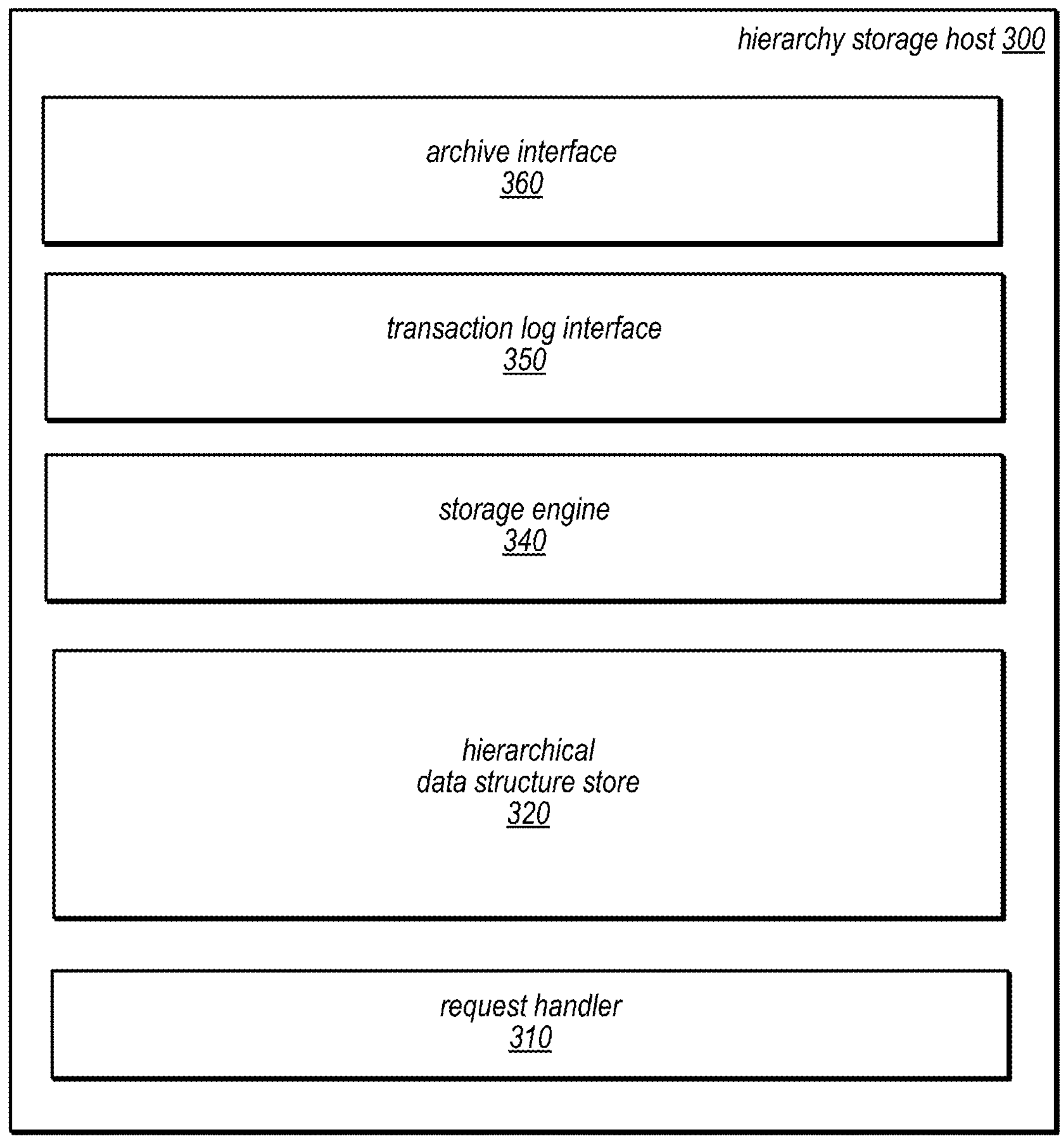
FIG. 3 is a block diagram illustrating a hierarchy storage host, according to some embodiments.

Hierarchy storage host(s) 240 may maintain and handle access to hierarchical storage hosts in directory storage service 220. FIG. 3 is a block diagram illustrating a hierarchy storage host, according to some embodiments. Hierarchy storage host 300 may implement request handler 310 to process access requests and pass along appropriate instructions or requests to other components, such as storage engine 340, transaction log interface 350 or archive interface 360. For example, access request handler 310 may interpret various requests formatted according to a programmatic interface. Access requests may include various ones of the requests described in the aforementioned figures as well as other types of requests, such as various access requests to create, update, attach, detach, delete and query nodes in a hierarchical data structure, and access requests to define, populate, discover, and query a local index (which may be strongly consistent and maintained as part of or separately from the hierarchical data structure) on hierarchical data structure node attributes.

In various embodiments, storage engine 340 may be a storage engine configured to interact with structure or format of data as it is stored in current hierarchical data structure store 320 and historical hierarchical data structure store 330 (e.g., a key-value storage engine for data maintained in key-value storage format, relational data storage engine for data maintained in a relational storage format, etc.), which may be maintained according to the models discussed below with regard to FIG. 4. In some embodiments, current hierarchical data structure store 320 may be partially or completely implemented in memory or other quick access storage devices, such as random access memory devices (RAM), as well as utilizing persistent block-based storage devices to store historical hierarchical data structure 330, including magnetic disk or solid state drives. In some embodiments, caching techniques may be implemented so that frequently accessed portions of data, such as frequently access portions of current hierarchical data structures are maintained in memory components whereas other portions are maintained in block-based persistent storage components. Hierarchy storage host 300 may operate multi-tenant storage for hierarchical data structures so that different hierarchical data structures maintained on behalf of different clients, accounts, customers, and the like may be maintained in current hierarchical data structure store 320 and current hierarchical data structure store 330. For example, hierarchy storage host 300 may participate in different replica groups with different hierarchy storage hosts for the different hierarchical data structures stored at hierarchy storage host 300.

Transaction log interface 350 may provide capabilities to interact with (e.g., validate transactions) with respect to the logs corresponding to hierarchical data structures stored in transaction log storage 250 for the hierarchical data structures. Similarly, archive interface 360 may be implemented to retrieve archived transactions or snapshots to service an access request for historical changes to the hierarchical data structure, a historical query, or other access requests that require a version of the hierarchical data structure that is older than that maintained in historical hierarchical data structure store.

Turning back to FIG. 2, transaction log storage 250 may provide a fault tolerant, high performance, durable, log publishing service. Transaction log storage 250 may be used as a commit log underlying strongly consistent distributed applications such as databases, key-value stores, and lock managers, and as illustrated in FIG. 2 directory storage service 220 providing hierarchical data storage. Transaction log storage 250 may provide strong consistency guarantees and support constraints between committed records, to enable features like deduplication, sequencing, and read-write conflict detection. For example, for different requests, transaction log storage 250 may determine whether or not to commit changes to hierarchical data structures (e.g., write requests and other modifications) by examining a proposed transaction for conflicts with other committed transactions. Such a feature may provide a fine-grained locking model over the hierarchical data structure (e.g., only those portions of the hierarchical data structure affected by a conflict between transactions may be locked). Transaction log storage may maintain a separate log or chain of log records for each hierarchical data structure, serving as an authoritative definition of the changes to the state hierarchical data structure over time. Transactions may be ordered according to transaction sequence numbers, which may be monotonically increasing to reference the state of a hierarchical data structure at individual points in time. Note that in some embodiments, transaction log storage 250 may be a separate network-based storage service implemented as part of provider network 250 external to directory storage service 220.

Archival worker(s) 236 may utilize transactions stored for different hierarchical data structures stored in respective transaction logs in transaction log storage 250 to generate and store snapshots of the hierarchical data structure at different points in time in archive storage service 270. For example, archival management may determine when snapshots of a hierarchical data structure should be captured, provision appropriate storage locations in archive storage service 270, and direct archive worker nodes (not illustrated) to perform the read, write, and other operations to generate and place the snapshots in archive storage service 270. Similarly, archival worker(s) 236 may direct the copying and storage of individual log records/transactions and/or groups of log records and transactions to be stored as part of an archived transaction log for hierarchical data structures in archive storage service 270.

Cross region replication 290 may selectively replicate updates to objects in a directory structure to directories stored in directory service 220 in other regions 202, as discussed below in FIGS. 5-11.

Generally speaking, clients 210 may encompass any type of client configurable to submit network-based services requests to provider network 200 via network 260, including requests for directory services (e.g., a request to create or modify a hierarchical data structure to be stored in directory storage service 220, etc.). For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application configured to interact directly with network-based services platform 200. In some embodiments, client 210 may be configured to generate network-based services requests according to a Representational State Transfer (REST)-style network-based services architecture, a document- or message-based network-based services architecture, or another suitable network-based services architecture.

In some embodiments, a client 210 may be configured to provide access to network-based services to other applications in a manner that is transparent to those applications. For example, client 210 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to hierarchical data structures in directory storage service 220) to and receive responses from network-based services platform 200 via network 260. In various embodiments, network 260 may encompass any suitable combination of networking hardware and protocols necessary to establish network-based-based communications between clients 210 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based services platform 200. It is noted that in some embodiments, clients 210 may communicate with network-based services platform 200 using a private network rather than the public Internet.

Different types of hierarchical data structures may be stored, managed, and or represented in different ways. FIG. 4 is a block diagram illustrating one example of a data model for a hierarchal data store that provides hierarchical data structures, according to some embodiments. A directory, for example may be a hierarchical data structure, such as directory structures 410*a* or 410*n*, and may be represented with circles or squares in the graph depicted of FIG. 4 (e.g., objects 400, 401, 402, 403, 404, 405, 406, 407, and 421). An object may have a globally unique identifier (GUID), zero or more attributes (key, value pairs), and zero or more links to other objects. In some embodiments, a directory may be one type of object which has zero or more child links to other objects, either directories or resources. Directory objects may have zero or one parent directory object, implying that directory objects and inks define a tree structure, in some embodiments. In FIG. 4, object 401 may be an example of a directory object. Resource objects may be leaf objects in a directory structure 410. A resource object may have a unique external Id (e.g., client specified) and client-defined attributes. Resource objects can have more than one parent object (which would allow for some hierarchical data structures to be configured as a Directed Acyclic Graph (DAG). Object 405 in FIG. 4 may be an example of a resource object and it has two parents (objects 402 and 403). Some objects may be remotely mastered, as illustrated in FIG. 4, while other objects may be locally mastered. Locally mastered objects may be updated or changed at the storage host that stores the directory, while remotely mastered objects may not be updated or changed at the storage host where the object is remotely mastered. Links can be established, as discussed below with regard to FIG. 8 to attach or detach objects that are between objects mastered in different regions.

In some embodiments, multiple types of resource objects may be implemented. For example, in some embodiments, policy objects may be a type of resource object with two user-defined attributes: a policy type and policy document (e.g., describing a policy applied to applicable objects). For example, object 406 in FIG. 4 may be an example of a policy resource object. Another type of resource object may be an index resource object. For example, an index resource object be an index on various attributes values of objects in the child objects and other descendant objects of the directory object to which the index object is attached. For example, if resource object 407 is an index object, then index object 407 may provide an index object for the attributes of child objects 402 and 403 as well as descendant objects 404, 405, and 406.

In some embodiments, a link may be a directed edge between two objects defining a relationship between the two objects. There may be many types of links, such as client visible link types and another link type for internal operation implementation. In some embodiments, a child link type may create a parent—child relationship between the objects it connects. For example, child link 'bb' connects object 401 and object 403. Child links may define the hierarchies of directory structures 410. Child links may be named in order to define the path of the object that the link points to. Another type of client visible link may be an attachment link. An attachment link may apply a resource object, such as a policy resource object or index resource object, to another resource object or directory object. Attachment links may not define the hierarchical structures of directory structures 410. For example, attachment link 'xx' applies the policy attribute stored in policy resource object 406 to directory object 402. Objects can have multiple attachments. In some embodiments, some attachment restrictions may be enforced, such as a restriction that not more than one policy resource object of any given policy type can be attached to a same object. A non-client visible type of link or implied link type may also be implemented in some embodiments, a reverse link. Reverse links may be used for optimizing traversal of directory structures 410 for common operations like resource object look-ups (e.g., policy lookups). Directory storage service 220 may maintain reverse links in the opposite direction of child and attachment links.

In various embodiments, objects in directory structures 410 can be identified and found by the pathnames that describe how to reach the object starting from a logical root object, starting with the link labeled "/" and following the child links separated by path separator "/" until reaching the desired object. For example, object 405 can be identified using the path: "/directory410a/aa/dd". As some objects may be children of multiple directory objects, multiple paths may identify an object. For example, the following path can also be used to identify object 405: "/directoryA/bb/ee". As directory structures 410 may be a collection of objects whose boundary is defined by the hierarchy of those objects in the collection (e.g., the resulting hierarchical data structure, such as the tree or DAG created by the links between objects). In this way, directory structures 410 may represent separate, independent, or partially independent, organizations.

To store the illustrated directory structures in a hierarchical data structure store, the described objects, links attributes, and the like may be modeled after a Resource Description Framework (RDF) data, in some embodiments. To maintain multiple versions of the hierarchical data structures, versioning information may also be included to express how the data has changed over time. RDF data may be structured as (Subject, Predicate, Object) tuples. When including additional versioning information this structure may become: (Subject, Predicate, Object, Version, PreviousVersion). To represent the hierarchical data structures based on RDF, there may be multiple types of RDF predicates. In some embodiments, one type of RDF predicates may represent links of the hierarchical data structure and another type of RDF predicates may represent attributes of the hierarchical data structure. Different types of predicates may represent the hierarchical data structure differently. Link predicates may be between two objects, whereas attribute predicates may be between an object and a value. Since a single object might participate in several predicates of the same type, but with different values, predicates may begin with a common prefix and end in some additional type or naming information to aid in lookups. For example, the version entry in a tuple of a predicate may be the logical timestamp (e.g., transaction sequence number) at which the link or attribute was created, as all changes to a hierarchical data structure may utilize the transaction resolution process provided by transaction log storage 250 and may be assigned an ordered logical timestamp by transaction log storage 250.

As noted above in FIG. 3, storage hosts may maintain a current version of a hierarchical data structure and past versions of a hierarchical data structure. In at least some embodiments, different respective tables may be maintained for each hierarchical data structure, one table that stores the data for the current version and another table that stores immutable records for the previous versions. In various embodiments a current version table or previous versions table may be accessed to perform various operations for a hierarchical data structure. For example an access request may specify a query: "Find all children for Object whose ID is GUID_401 select GUID_401.child.* from CurrentVersion" or a query: "Find all policies for a resource object who's ID is GUID_405 along all paths to the root. To service such queries, a depth first traversal may be executed along the parent links. At each object along the path to the root, the following internal queries may be executed: internal query 1: "Find if the object has policies: select GUID_405.link.HasPolicy.* from CurrentVersion;" internal query 2: "If the object has policies returned in internal query 1, use the value from the link to get the policy document value from the policy object: select GUID_406.link.PolicyDoc from CurrentVersion," internal query 3: "Find all parents for current object and perform internal queries 1-3 for each parent object until reaching the root of the directory structure. Please note that previous examples are not intended to be limiting as to the format, structure, syntax, or other ways in which queries may be expressed or processed with respect to hierarchical data structures.

FIG. 5 is a block diagram illustrating the use of a separate transaction log store to provide consistent storage for versioned hierarchical data structures, according to some embodiments. Multiple clients, such as clients 510*a*, 510*b*, and 510*c* may perform various access requests to a hierarchical data structure concurrently, such as various write requests 512*a*, 512*b*, 512*c*. In a least some embodiments, replica group 520 may include multiple storage hosts, such as hierarchy storage host 522*a*, 522*b*, and 522*c* that maintain versions of the hierarchical data structure that are available for servicing various access requests from clients 510. For example, clients 510 may submit different write requests 512 to hierarchy storage hosts 522 according to a routing schema which may direct access requests from each client to a different storage host in replica group 520 according to a load balancing scheme. Upon receiving the request, each hierarchy storage host 522 may perform various operations upon a current version of the hierarchical data structure at the storage host, then offer the writes 524 to transaction log storage 210 for commitment to directory structure log 530 including various information such as the affected or accessed data by performing the write request, the write request itself, and a transaction sequence number of other indication identifying the point-in-time of the current version of the hierarchical data structure at the storage host 522. Indications of commitment 526 or conflict may be provided to the respective storage hosts 522. For those writes that are committed, the directory structure log may be read and committed writes applied 532 to the respective versions of the hierarchical data structure maintained at storage hosts 522.

In some embodiments, archival worker(s) 550 may also read the directory structure log 530 to retrieve writes 534 for transmission as archived transactions or snapshots. Archival worker(s) 550 may then periodically or aperiodically update 542 an archived log 540 in archive storage service 270 and generate and send new snapshots 552 to be maintained as part of archived snapshots 550. In this way, the hierarchical data structure can be recreated at any point-in-time, for example by loading a snapshot onto a storage host and applying transactions from archived log 540 to reach a certain transaction sequence number so that the version of the hierarchical data structure at the storage number is consistent with a specified point-in-time. Archival worker may generate filtered snapshots for performing scaling events to move some directories from storage host to another.

Cross region replication 290 may retrieve writes 562 from transaction log storage 250 in order to generate update events as discussed below for replication to eligible directories, as discussed below with regard to FIGS. 6 and 7. Cross region replication 290 may also retrieve metadata 564 from replica group 520 in order to generate the update events (e.g., eligible regions). Cross region replication 290 may offer remote writes 566 to transaction log storage 250 for received updates from other regions, in some embodiments. In other embodiments, cross region replication 290 may offer updates to replica group 520 directly (e.g., to the replica group that stores the hierarchical data structure to which the update applies).

Figure 6:
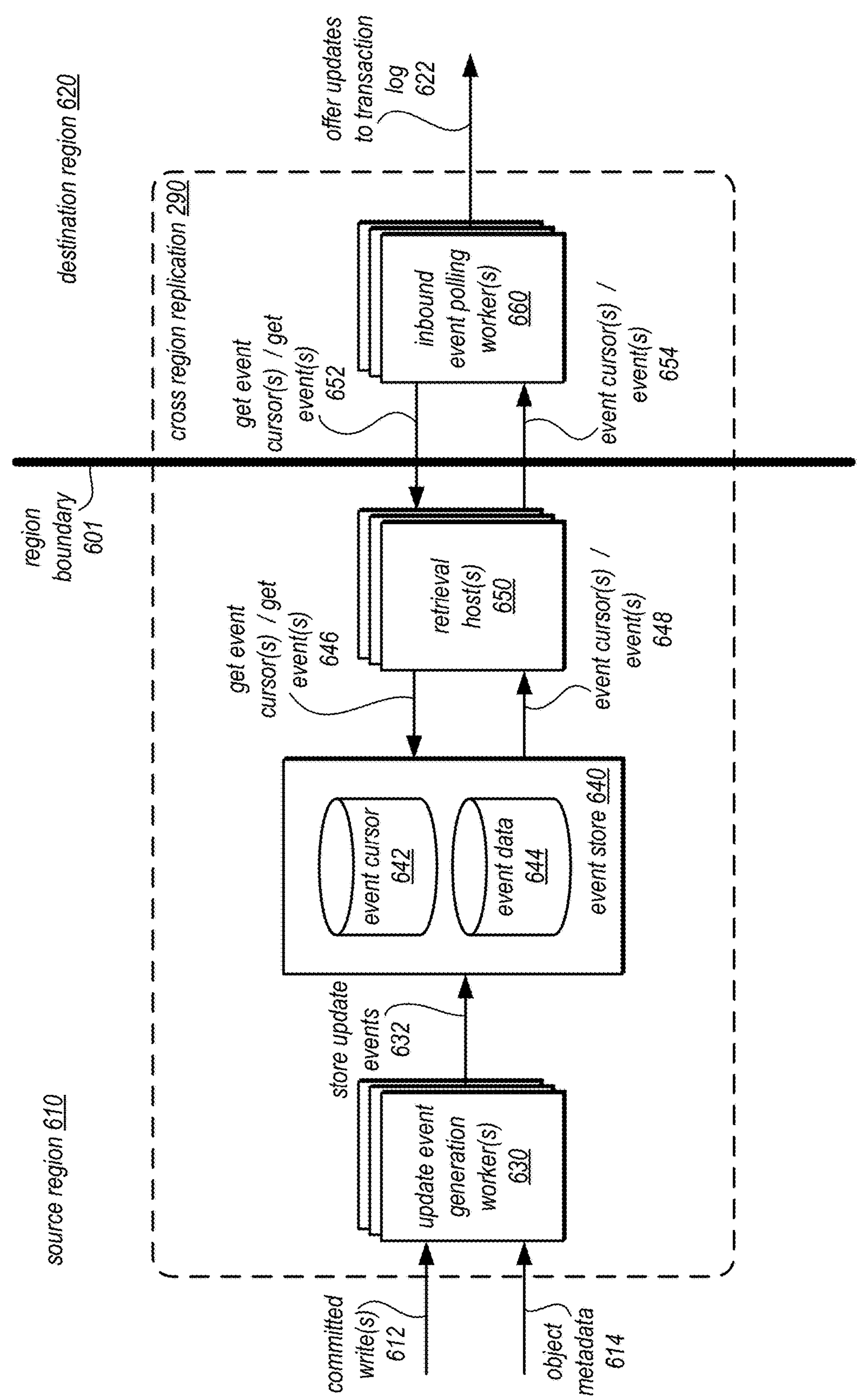
FIG. 6 is a block diagram illustrating a pull-based cross region replications service for directories, according to some embodiments.
Figure 7:
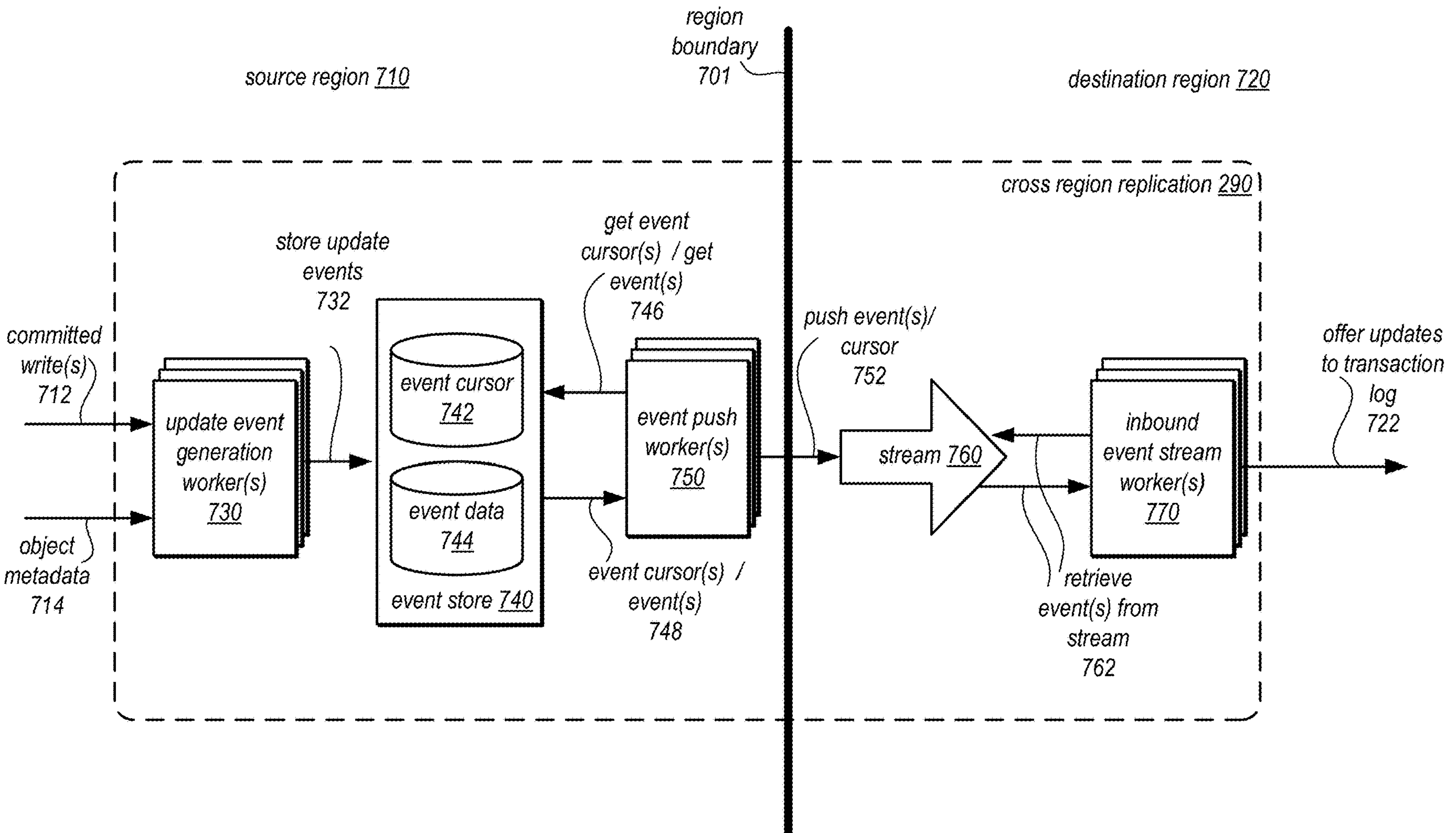
FIG. 7 is a block diagram illustrating a push-based cross region replications service for directories, according to some embodiments.

FIG. 6 is a block diagram illustrating a pull-based cross region replications service for directories, according to some embodiments. A replication operation may involve a source region 610 and a destination region 620 separated by a region boundary 601 (e.g., network boundaries, physical or geographic boundaries, logical boundaries, or other fault tolerance boundary such that the failure of one region does not cause a failure of another region). Cross region replication 290 may implement components in the separate provider network regions to perform the illustrated functionalities so that the directory storage service in each provider network region can send and accept updates from other regions to a directory structure that is replicated at multiple regions. Cross region replication 290 may implement update event generation worker(s) to accept committed write(s) 612 and obtain/generate object metadata 614 in order to generate update events. Update events may describe one or more updates for objects in the directory, in various embodiments. For example, update data event generation worker(s) 630 may store, as part of event data, the event type (e.g., create container, create directory, create resource, attach node, detach node, regional attach node, regional detach node, delete node, put node attributes, delete node attributes, create policy, attach policy, detach policy, or delete policy), source update or transaction in the log (e.g., a log record or bundle of log records identifier), source region, source directory, identity of destination regions to receive the event, and/or any other information, including signatures or values used to check data integrity upon receipt of the data in different locations. Update event generation worker(s) 630 may then store 632 the update events to event store 640. In some embodiments, the events may be bundled or grouped together in storage as part of event data 644. Event cursor 642 may indicate the latest event ids to be applied for a directory.

Inbound event polling worker(s) 660 may implement polling behavior to get event cursors from retrieval host(s) 650 in source region 610. Retrieval host(s) 650 may respond to received requests, such as requests to get event cursors 646 and provide them to inbound polling event worker(s)

660. Inbound event polling worker(s) 660 may then decide based on the event id in the cursors whether any new updates for a directory are available. If so, inbound event polling worker(s) 660 may request the events 652 from retrieval host(s) 650, which may get the events 648 from event store 640 and return the events 654 to inbound event polling worker(s) 660. Inbound event polling worker(s) 660 may then offer updates described by the received events as updates to the transaction log 622 for objects in the directory structure. In some embodiments, inbound event polling worker(s) may offer the updates 622 to storage hosts in destination region 620 for processing (e.g., offering to the transaction log for the directory structure in destination region 620). Inbound event polling worker(s) may perform various techniques, such as those discussed below with regard to FIG. 10, to prevent the application of duplicate updates, or the application of updates out of order (e.g., by blocking, or stalling updates that should not, or should not yet, be applied).

In contrast with the pull-based replication techniques discussed above, push-based replication techniques may be implemented to selectively update hierarchical data structures, in some embodiments. FIG. 7 is a block diagram illustrating a push-based cross region replications service for directories, according to some embodiments. As noted above, a replication operation may involve a source region 710 and a destination region 720. Cross region replication 290 may implement components in the separate provider network regions to perform the illustrated functionalities so that the directory storage service in the provider network region can send and accept updates from other regions to a directory structure. As discussed above, cross region replication 290 may implement update event generation worker (s) to accept committed write(s) 712 and object metadata 714 in order to generate update events. Update event generation worker(s) 730 may then store 732 the update events into event store 740, which may maintain event cursor 742 and event data 744 (as discussed above with regard to FIG. 6).

Cross region replication 290 may implement event push worker(s) 750, to get event cursors/data 746, receive event cursors/data 748 and push the events and cursor 752 to data stream storage 760. Data stream storage 760 may be a data stream service, component, or other store that allows clients to input data according to a client-specified ordering so that the data can be retrieved from the stream by other clients according to the same ordering, in some embodiments. Data stream storage 760 maybe implemented as part of stream management service (e.g., another network-based service 280 in the provider network) that may provide programmatic interfaces (e.g., application programming interfaces (APIs), web pages or web sites, graphical user interfaces, or command-line tools) to enable the creation, configuration and deletion of data streams, as well as the submission, storage and retrieval of stream data records in some embodiments. Inbound event stream worker(s) 770 may retrieve event(s) 762 from the stream 760 and offer them as updates to the transaction log 722 for the object in the directory structure.

Figure 8:
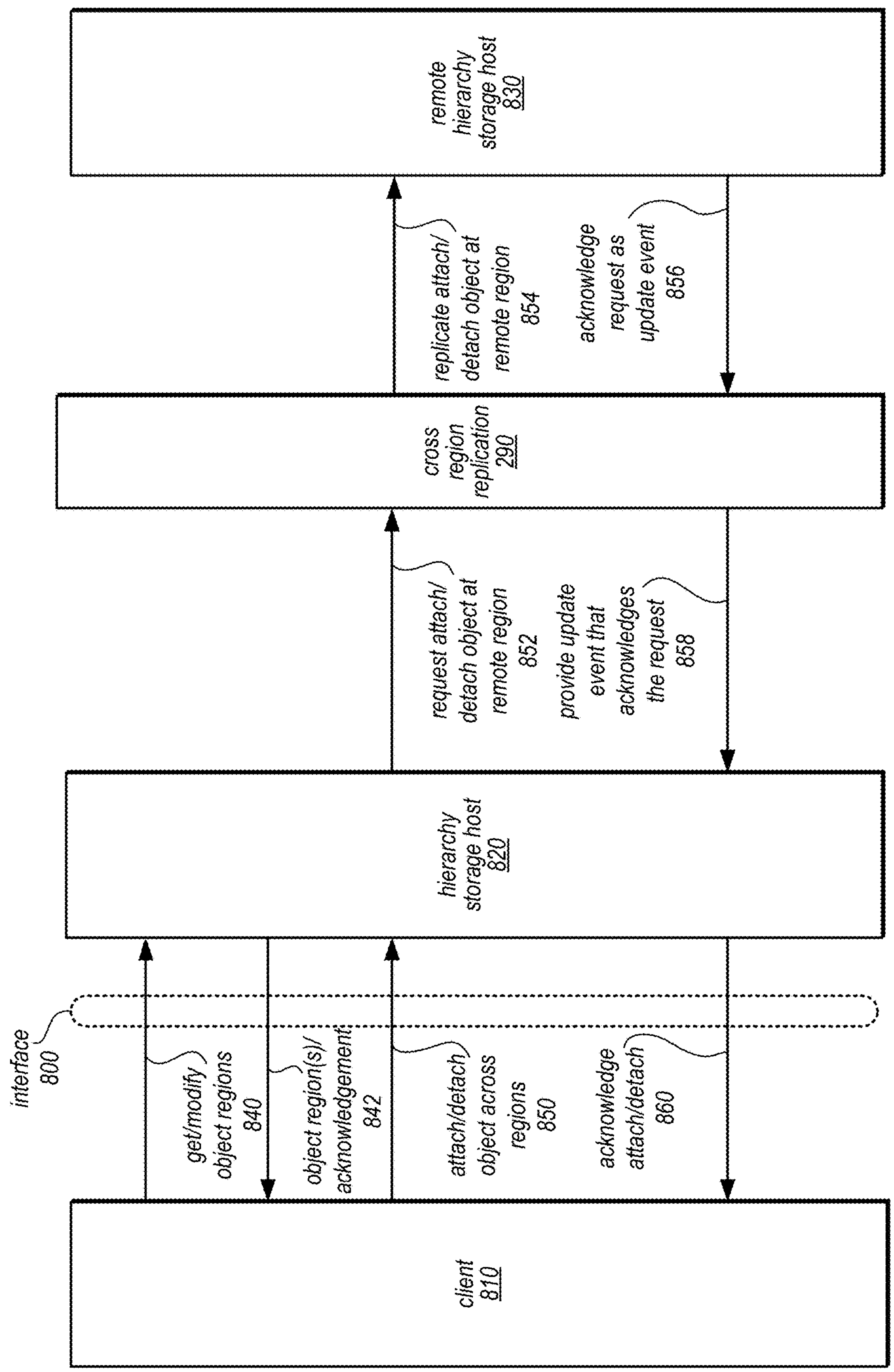
FIG. 8 illustrates interactions between a client and a hierarchy storage node to manage selective replication of objects in a hierarchical data structure according to region, according to some embodiments.

Clients, users, or other stakeholders may leverage selective replication to present and manage different data in the hierarchical data structure differently depending on the distributed data store. For example, data subject to certain regulatory controls can be managed in accordance with those regulatory controls applicable to one geographic location while regulations applicable to a distributed data store in another region may be managed according to the different regulations. FIG. 8 illustrates interactions between a client and a hierarchy storage node to manage selective replication of objects in a hierarchical data structure according to region, according to some embodiments. Client 810 may be a client like client 210 discussed above with regard to FIG. 2. Client 810 may interact with directory storage service 220 according to interface 800, which may be a programmatic interface (e.g., Application Programming Interface (API)), command line interface, or graphical user interface, in some embodiments. Hierarchy storage host 820 may handle requests received via interface 800, in some embodiments.

Client 810 may manage the replication of data objects to different regions of the directory storage service offered by provider network 200. For example, a request 840 may be a request to get a list of regions specified for replication of a particular object. In some embodiments, the request may specify a default region list (e.g., all, or regions with a particular characteristic (e.g., US, Europe, Asia, etc.). The requested regions may be returned, as indicated at 840. Other management requests, to add or remove regions for an object may also be performed along with receiving the appropriate acknowledgement. Hierarchy storage host 820 may access or update the attributes or metadata for the object to process the management request 840.

Client 810 may send a request 850 to attach or detach an object that is locally mastered to a node that is mastered in another region to hierarchy storage host 820. Hierarchy storage host 820 may send a request to the remote region 852 to accomplish the attachment, which may be replicated to a remote hierarchy storage host via cross region replication 290. Remote hierarchy storage host 830, in the region that masters the object that is to be attached to, may receive the request 854 to attach or detach the node. Remote hierarchy storage host 830 may accept (or reject) the request and perform the update to the object data or metadata at remote hierarchy storage host 830 (e.g., by proposing the update as a change to the transaction log in remote region 852 for the hierarchical data structure). The acknowledgement of the request may be treated as an update event and provided back to the client via cross region replication 290. For example, an acknowledgement of the request as an update event 854 may be made to cross region replication 290 which may (by the various techniques discussed above) provide the update event that acknowledges the request 856 back to hierarchy storage host 820. As a cross region attachment/detachment request may be performed asynchronously, an acknowledgement 858 may (or may not) be sent to client 810. Alternative notifications (e.g., messaging systems, electronic mail, etc.) may be performed. In some embodiments, cross region attachments/detachments may be acknowledged/displayed/ or otherwise indicated or treated as pending by hierarchy storage host 820.

Figure 9:
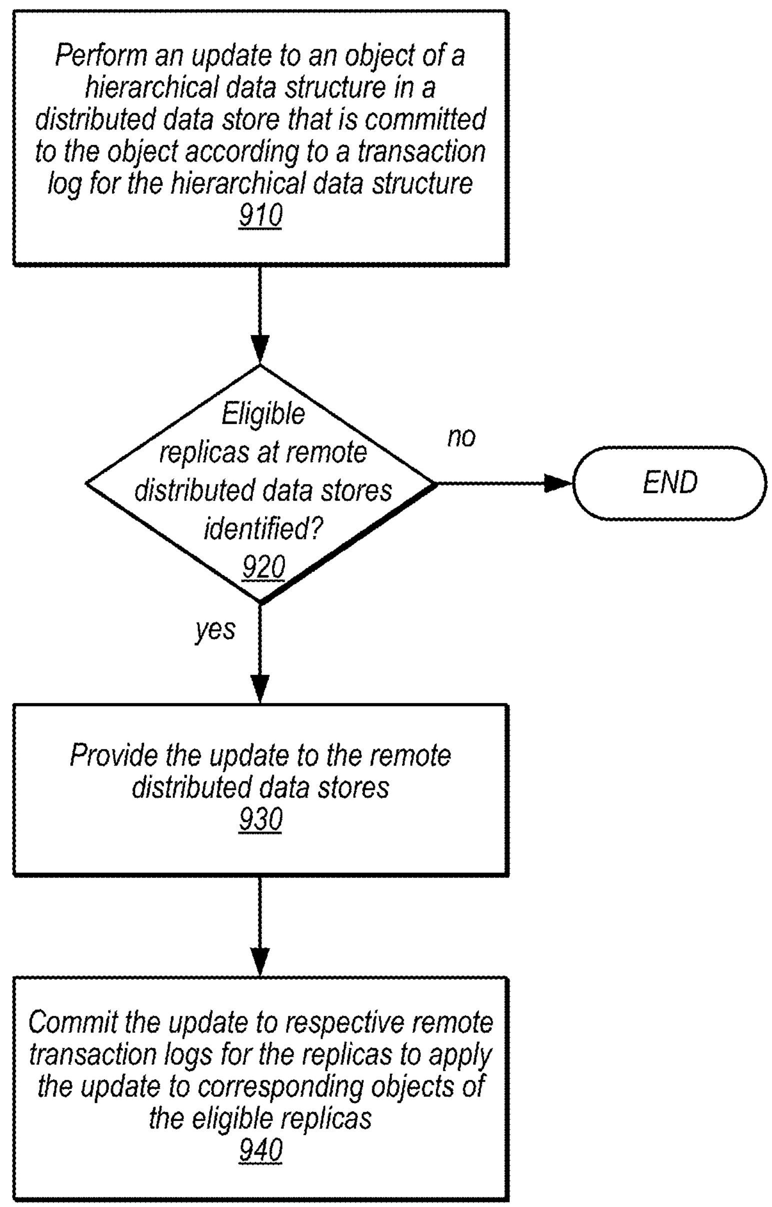
FIG. 9 is a high-level flowchart illustrating methods and techniques to selectively replicate changes to hierarchical data structures, according to some embodiments.

The directory storage service, access requests, and other techniques discussed in FIGS. 2 through 8 provide examples of a distributed data store storing a hierarchical data structure for a client and performing selective replication to other hierarchical data structures in different regions or networks. However, various other types of distributed storage systems may implement selective replication of changes to hierarchical data structures, in other embodiments, which may utilize other numbers or types of components, which may provide distributed data storage. FIG. 9 is a high-level flowchart illustrating methods and techniques to selectively replicate changes to hierarchical data structures, according to some embodiments. Various different distributed data stores including the embodiments described above may implement the techniques described below.

As indicated at 910, an update to an object of a hierarchical data structure stored in a distributed data store may be performed that is committed to the object according to a transaction log for the hierarchical data structure, in some embodiments. For example, updates may include requests to create the object, delete the object, modify the object (e.g., attributes or links), or perform any other operation that changes the object. A determination may be made, as indicated at 920, as to whether other replicas of the hierarchal data structure stored in other remote distributed data stores are eligible to receive the update to the object, in some embodiments. For example, metadata or other information (e.g., replication permissions or settings) maintained for the object may identify a set of one or more distributed data structures which may be eligible to receive the update. In some embodiments, eligible replicas may be dynamically identified. For example, characteristics of the different distributed data sets (e.g., labels, tags, geographic, locations, or relationships) may be evaluated to select the set of distributed data stores and thus regions which are eligible to apply the update. Note that not all distributed data stores are eligible for updates for the same hierarchical data structure. Eligible distributed data stores may vary from object to object, so that in at least some embodiments a distributed data store that stores a replica of the hierarchical data structure is not eligible and thus does not apply the update to the object.

If no distributed data stores are identified, then as indicated by the negative exit from 920, replication of the update may not be performed. If some distributed data stores are identified, then as indicated by the positive exit from 920, the update to the object may be provided to the identified remote distributed data stores, as indicated at 930, in some embodiments. For example, pull-based, techniques, such as those discussed above with regard to FIG. 6 may be implemented in some embodiments. Push-based, techniques, such as those discussed above with regard to FIG. 7 may be implemented in some embodiments. Updates to the remote distributed data stores may be made directly to storage systems or hosts that maintain the replica of the hierarchical data structure or may be submitted via a replication mechanism, like cross region replication 290 discussed above, that ensures that updates are received and applied once, according to a same ordering as at the source replica of the hierarchical data structure.

Once provided to the remote distributed data stores, the update may be committed to the respective transaction log at each remote distributed data store for the replicas of the hierarchical data structure to apply the update to the corresponding objects in the eligible replicas (e.g., according to the techniques discussed above with regard to FIG. 5). For example, the remote distributed data stores may propose the update for commitment to a transaction log, which may then determine whether the proposed updated conflicts with other committed updates in the transaction log. If the update does not conflict, then the update may be committed. If the update does conflict, then the update may fail as if the update were submitted locally.

Figure 10:
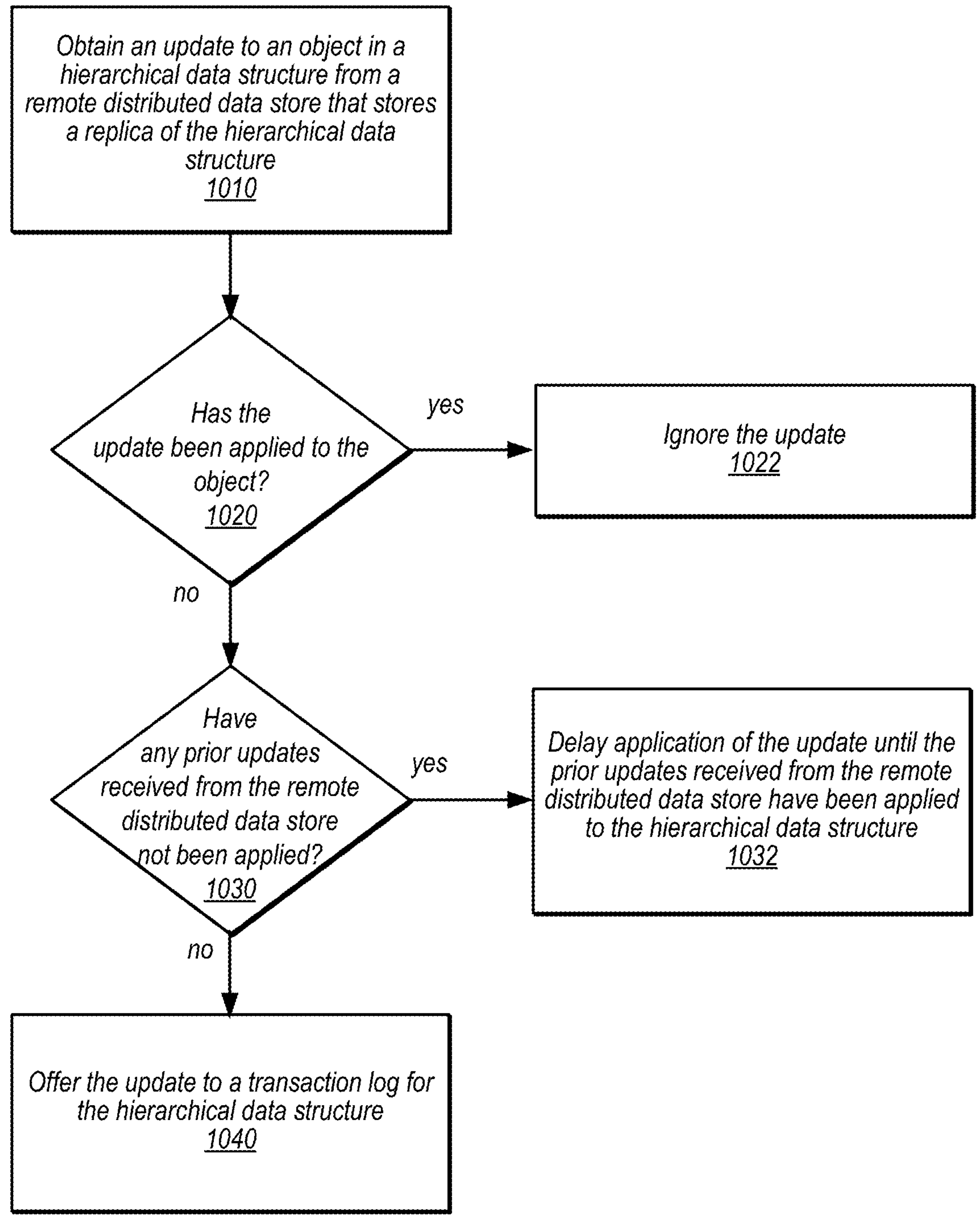
FIG. 10 is a high-level flowchart illustrating methods and techniques to accept updates from a remote distributed data store for a hierarchical data structure, according to some embodiments.

FIG. 10 is a high-level flowchart illustrating methods and techniques to accept updates from a remote distributed data store for a hierarchical data structure, according to some embodiments. As indicated at 1010, an update to an object in a hierarchical data structure may be obtained from a remote distributed data store that stores a replica of the hierarchal data structure, in various embodiments. For example, a push-based technique, as discussed above with regard to FIG. 7 or a pull-based technique, as discussed above with regard to FIG. 6 may be implemented, in different embodiments. In some embodiments, previously applied updates may be determined prior to obtaining the update. For example, a cursor value for the hierarchical data structure indicating a sequence number of other logical ordering that identifies a point in the logical order up to which all updates have been applied may be examined. However obtained, a determination may be made, as indicated at 1020, as to whether the update has been applied to the object, in some embodiments. For example, multiple workers, processes, or other components may apply received updates, and thus a same update could be attempted multiple times by different components. By checking to whether the update has been applied, the update may be ignored, as indicated at 1022, if already applied. In this way, updates to objects may be replicated as idempotent operations.

As indicated at 1030, in some embodiments a determination may be made as to whether any prior updates have been received from the remote distributed data store for the hierarchical data structure that have not been applied. For example, updates may be ordered according to a logical ordering (e.g., sequence numbers, logical timestamps, etc.) in order to ensure that replicated changes are seen in the same order at every hierarchical data structure that applies the replicated changes. A determination may be made as to whether any outstanding updates (e.g., in a update status table or other set of metadata maintained for the hierarchical data structure) earlier in the logical ordering remain to be applied, in some embodiments. As indicated at 1032, if any prior updates have not been applied, then application of the update may be delayed until the prior updates received from the remote distributed data store have been applied to the hierarchical data structure. For example, the worker or component processing the update may mark or update the update status table or other metadata to indicate that the update has not yet been applied. However, as indicated by the negative exit from 1030, if no prior updates remain to be applied, then the update may be offered to the transaction log for application to the hierarchical data structure, as indicated at 1040.

Figure 11:
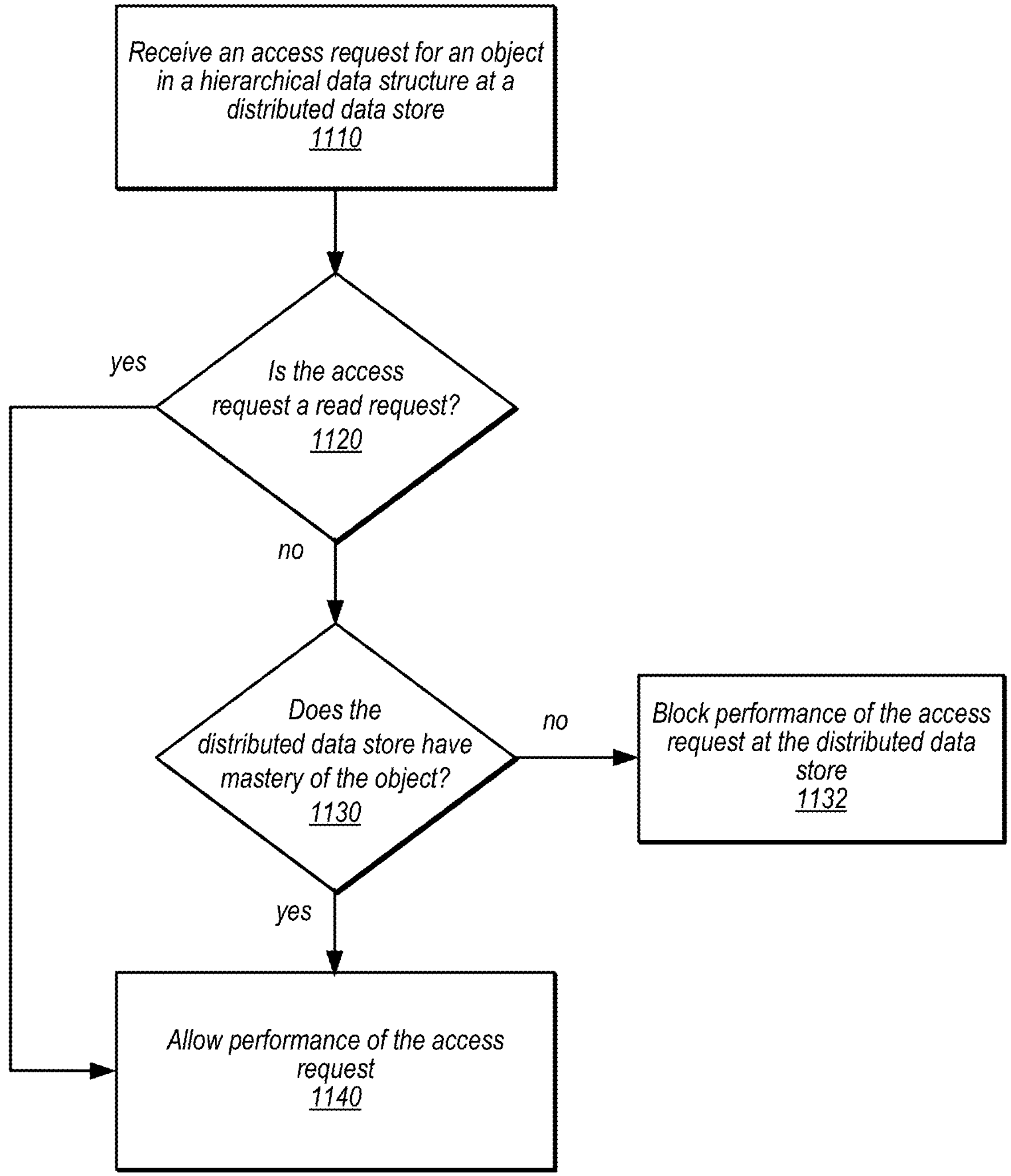
FIG. 11 is a high-level flowchart illustrating methods and techniques to process access requests at a hierarchical data structure that masters different objects of a hierarchical data structure at different distributed data stores, according to some embodiments.

Different objects in a same hierarchical data structure maybe mastered in different regions as a result of selective replication for hierarchical data structures, as noted above. FIG. 11 is a high-level flowchart illustrating methods and techniques to process access requests at a hierarchical data structure that masters different objects of a hierarchical data structure at different distributed data stores, according to some embodiments. As indicated at 1110, an access request for an object in a hierarchical data structure may be received at a distributed data store, in various embodiments. Different types of access requests may be received, as discussed above. If, for instance, the access request is a read request, then as indicated by the positive exit from 1120, the access request may be allowed to perform, and thus read the data specified in the read request, as indicated at 1140, because hierarchical data structure data that is present in a replica may be read by default (as it would not be replicated to the hierarchical data structure if that hierarchical data structure were not allowed to provide access to it).

For other access requests, such as access requests to update, change, add, remove or delete data (objects, attributes, links, etc.), then a determination may be made as to whether the distributed data store has mastery of the object, as indicated at 1130. Mastery of objects may, include, for example, the write or update permissions for an object (e.g., the master of an object has exclusive write or update permissions for the object). A determination may be made as to whether the data store has mastery by examining metadata for the object (e.g., metadata that identifies the master explicitly, such as a master data store or region id, or the id of the region or distributed data store that created the object). If the distributed data store does not have mastery of the object, then as indicated at 1132, performance of the access request may be blocked at the distributed data store. In some embodiments, information may be provided which identifies the distributed data store that does have mastery for the object in response to a blocked access request. If the distributed data store does have mastery of the object, then as indicated at 1140, performance of the access request may be allowed.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 12:
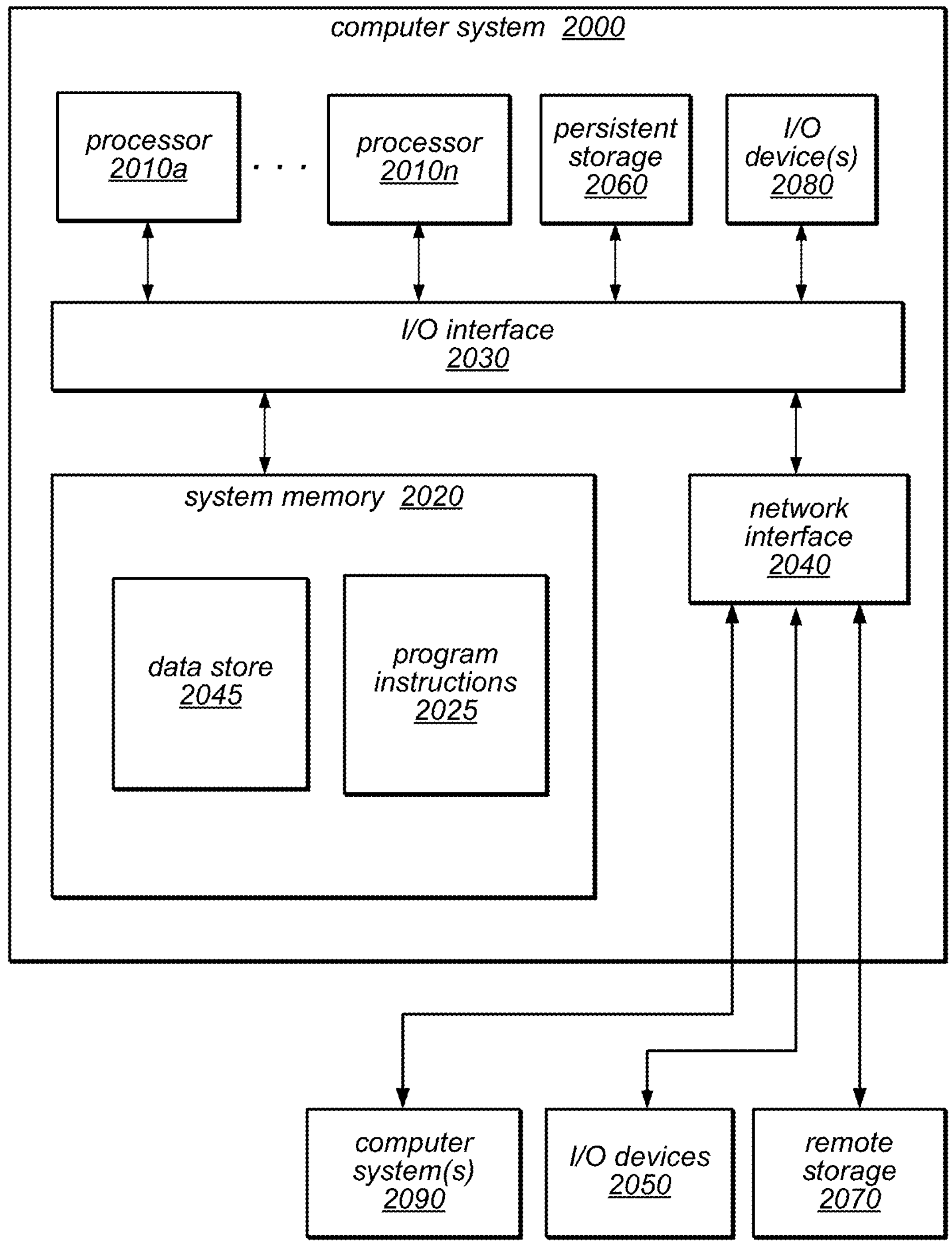
FIG. 12 is an example computer system, according to various embodiments.

FIG. 12 is a block diagram illustrating a computer system configured to implement selective updates to hierarchical data structures, according to various embodiments, as well as various other systems, components, services or devices described above. For example, computer system 2000 may be configured to implement hierarchy storage nodes that maintain versions of hierarchical data structures or components of a transaction log store that maintain transaction logs for hierarchical data structures, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a to uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the directory storage systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a hierarchy storage nodes that maintain versions of hierarchical data structures or components of a transaction log store that maintain transaction logs for hierarchical data structures, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the hierarchy storage nodes or transaction log store described herein may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement embodiments described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one memory cause the at least one memory to implement a first geographic region of a plurality of different geographic regions of a directory storage service, the first geographic region configured to:

receive a request to attach a first object to a second object in a hierarchal data structure stored at a plurality of replicas across the plurality of different geographic regions of the directory storage service, wherein the second object is mastered in a second geographic region of the plurality of different geographic regions;

send a request to the second region of the plurality of geographic regions to update a replica of the hierarchical data structure in the second geographic region to attach the first object to the second object;

update another replica of the hierarchical data structure in the first geographic region to attach the first object to the second object in response to an acknowledgement that the second geographic region performed the attachment of the first object to the second object; and acknowledge the request to attach the first object to the second object in the hierarchal data structure.

2. The system of claim 1, wherein the first object is mastered in the first geographic region.

3. The system of claim 1, wherein the first geographic region is further configured to:

receive a request to detach the first object from the second object in the hierarchal data structure;

send a request to the second region of the plurality of geographic regions to update the replica of the hierarchical data structure in the second geographic region to detach the first object from the second object;

update the another replica of the hierarchical data structure in the first geographic region to detach the first object from the second object in response to an acknowledgement that the second geographic region performed the detachment of the first object from the second object; and acknowledge the request to detach the first object from the second object in the hierarchal data structure.

4. The system of claim 1, wherein the attachment of the first object to the second object is not eligible to be replicated to a third geographic region of the plurality of different geographic regions.

5. The system of claim 1, wherein the first object is not available for access by a client at the second geographic region of the directory storage service.

6. The system of claim 1, wherein the first geographic region is further configured to perform an update to the first object stored in the another replica of hierarchical data structure at the first geographic region of the directory storage service in response to a request to update the first object, wherein the update is not replicated to the replica of the hierarchical data structure at the second geographic region of the directory storage service.

7. The system of claim 1, wherein the update to the replica of the hierarchical data structure in the second geographic region to attach the first object to the second object is committed to a transaction log for the replica of the hierarchical data structure.

8. A method, comprising:

receiving, at a first geographic region of a directory storage service, a request to attach a first object to a second object in a hierarchal data structure stored at a plurality of replicas across the plurality of different geographic regions of the directory storage service including the first geographic region, wherein the second object is mastered in a second geographic region of the plurality of different geographic regions;

sending, by the first geographic region of the directory storage service, a request to the second region of the plurality of geographic regions to update a replica of the hierarchical data structure in the second geographic region to attach the first object to the second object;

updating, by the first geographic region of the directory storage service, another replica of the hierarchical data structure in the first geographic region to attach the first object to the second object in response to an acknowledgement that the second geographic region performed the attachment of the first object to the second object; and acknowledging, by the first geographic region of the directory storage service, the request to attach the first object to the second object in the hierarchal data structure.

9. The method of claim 8, wherein the first object is mastered in the first geographic region.

10. The method of claim 8, further comprising:

receiving, by the first geographic region of the directory storage service, a request to detach the first object from the second object in the hierarchal data structure;

sending, by the first geographic region of the directory storage service, a request to the second region of the plurality of geographic regions to update the replica of the hierarchical data structure in the second geographic region to detach the first object from the second object;

updating, by the first geographic region of the directory storage service, the another replica of the hierarchical data structure in the first geographic region to detach the first object from the second object in response to an acknowledgement that the second geographic region performed the detachment of the first object from the second object; and acknowledging, by the first geographic region of the directory storage service, the request to detach the first object from the second object in the hierarchal data structure.

11. The method of claim 8, wherein the attachment of the first object to the second object is not eligible to be replicated to a third geographic region of the plurality of different geographic regions.

12. The method of claim 8, wherein the first object is not available for access by a client at the second geographic region of the directory storage service.

13. The method of claim 8, further comprising performing an update to the first object stored in the another replica of hierarchical data structure at the first geographic region of the directory storage service in response to a request to update the first object, wherein the update is not replicated to the replica of the hierarchical data structure at the second geographic region of the directory storage service.

14. The method of claim 8, wherein the update to the replica of the hierarchical data structure in the second geographic region to attach the first object to the second object is committed to a transaction log for the replica of the hierarchical data structure.

15. One or more non-transitory, computer-readable storage media, storing program instructions that when executed on or across one or more computing devices cause the one or more computing devices to implement a first geographic region of a plurality of different geographic regions of a directory storage service that implements:

receiving a request to attach a first object to a second object in a hierarchal data structure stored at a plurality of replicas across the plurality of different geographic regions of the directory storage service including the first geographic region, wherein the second object is mastered in a second geographic region of the plurality of different geographic regions;

sending a request to the second region of the plurality of geographic regions to update a replica of the hierarchical data structure in the second geographic region to attach the first object to the second object;

updating another replica of the hierarchical data structure in the first geographic region to attach the first object to the second object in response to an acknowledgement that the second geographic region performed the attachment of the first object to the second object; and acknowledging the request to attach the first object to the second object in the hierarchal data structure.

16. The one or more non-transitory, computer-readable storage media of claim 15, wherein the first object is mastered in the first geographic region.

17. The one or more non-transitory, computer-readable storage media of claim 15, storing further program instructions that when executed on or across the one or more computing devices causes the one or more computing devices to implement:

receiving a request to detach the first object from the second object in the hierarchal data structure;

sending a request to the second region of the plurality of geographic regions to update the replica of the hierarchical data structure in the second geographic region to detach the first object from the second object;

updating the another replica of the hierarchical data structure in the first geographic region to detach the first object from the second object in response to an acknowledgement that the second geographic region performed the detachment of the first object from the second object; and acknowledging the request to detach the first object from the second object in the hierarchal data structure.

18. The one or more non-transitory, computer-readable storage media of claim 15, wherein the attachment of the first object to the second object is not eligible to be replicated to a third geographic region of the plurality of different geographic regions.

19. The one or more non-transitory, computer-readable storage media of claim 15, wherein the first object is not available for access by a client at the second geographic region of the directory storage service.

20. The one or more non-transitory, computer-readable storage media of claim 15, storing further program instructions that when executed on or across the one or more computing devices causes the one or more computing devices to implement performing an update to the first object stored in the another replica of hierarchical data structure at the first geographic region of the directory storage service in response to a request to update the first object, wherein the update is not replicated to the replica of the hierarchical data structure at the second geographic region of the directory storage service.

* * * * *